(12) United States Patent
Nakano et al.

(10) Patent No.: US 6,418,232 B1
(45) Date of Patent: Jul. 9, 2002

(54) METHOD OF AUTHENTICATING DIGITAL-WATERMARK PICTURES

(75) Inventors: Kazunori Nakano; Juńichi Taguchi, both of Sagamihara; Hiroshi Yoshiura, Tokyo; Isao Echizen; Yutaka Kurosu, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/383,199

(22) Filed: Aug. 26, 1999

(30) Foreign Application Priority Data

Aug. 28, 1998 (JP) .......... 10-243346

(51) Int. Cl.[7] ............................. G06K 9/00
(52) U.S. Cl. .................. 382/100; 359/2; 380/252; 705/57
(58) Field of Search .................. 382/100, 232, 382/115, 183, 250; 235/469; 345/421, 502, 505, 530; 359/30, 2; 380/252, 54; 705/54, 57; 709/231, 236

(56) References Cited

U.S. PATENT DOCUMENTS

| | | | | |
|---|---|---|---|---|
| 5,502,576 A | * | 3/1996 | Ramsay et al. | 358/444 |
| 5,687,236 A | * | 11/1997 | Moskowitz et al. | 380/28 |
| 5,748,783 A | * | 5/1998 | Rhoads | 382/232 |
| 5,751,854 A | * | 5/1998 | Saitoh et al. | 382/218 |
| 5,893,101 A | * | 4/1999 | Balogh et al. | 707/100 |
| 5,930,369 A | * | 7/1999 | Cox et al. | 380/54 |
| 5,946,414 A | * | 8/1999 | Cass et al. | 382/183 |
| 5,974,548 A | * | 10/1999 | Adams | 713/200 |

OTHER PUBLICATIONS

IBM Systems Journal, vol. 35, Nos. 3 & 4, 1996, "Techniques for Data Hiding", W. Bender et al, pp. 313–336.
Digital Imaging Processing, R. Gonzales, pp. 300–301.
Digital Imaging Processing, R. Gonzales, pp. 580–585.

* cited by examiner

Primary Examiner—Jayanti K. Patel
(74) Attorney, Agent, or Firm—Mattingly, Stanger & Malur, P.C.

(57) ABSTRACT

An extraction process includes the steps of carrying out a geometric transformation on a picture being inspected to transform the size of the picture being inspected into a reduced scale of an original picture; creating a plurality of degraded original pictures with different types each obtained as a result of degradation of the original picture; creating a plurality of differential pictures by subtraction of the degraded original pictures with different types from the picture being inspected with a transformed size to cancel degradation components in the picture being inspected with a transformed size; and extracting the information corresponding to the authentication information.

11 Claims, 10 Drawing Sheets

FIG.2
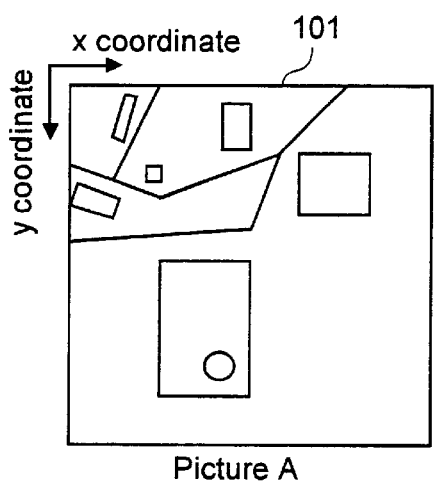
Picture A
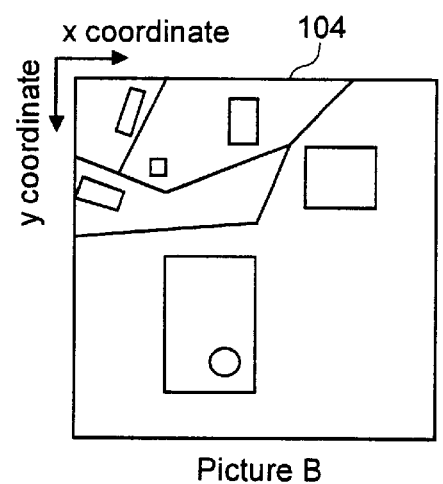
Picture B
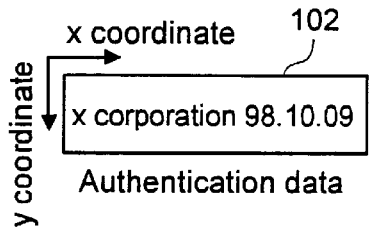
Authentication data
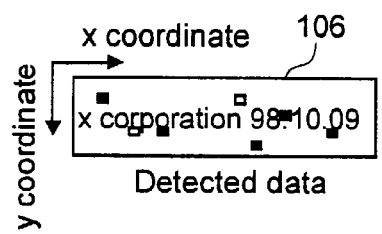
Detected data
| Number | | 1 | 2 | 3 | 4 | ... |
|---|---|---|---|---|---|---|
| Coordinates | x | 125 | 256 | 50 | 103 | ... |
| | y | 384 | 238 | 143 | 212 | ... |
Embedding positions
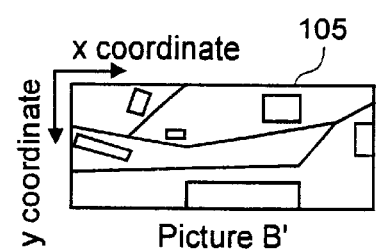
Picture B'

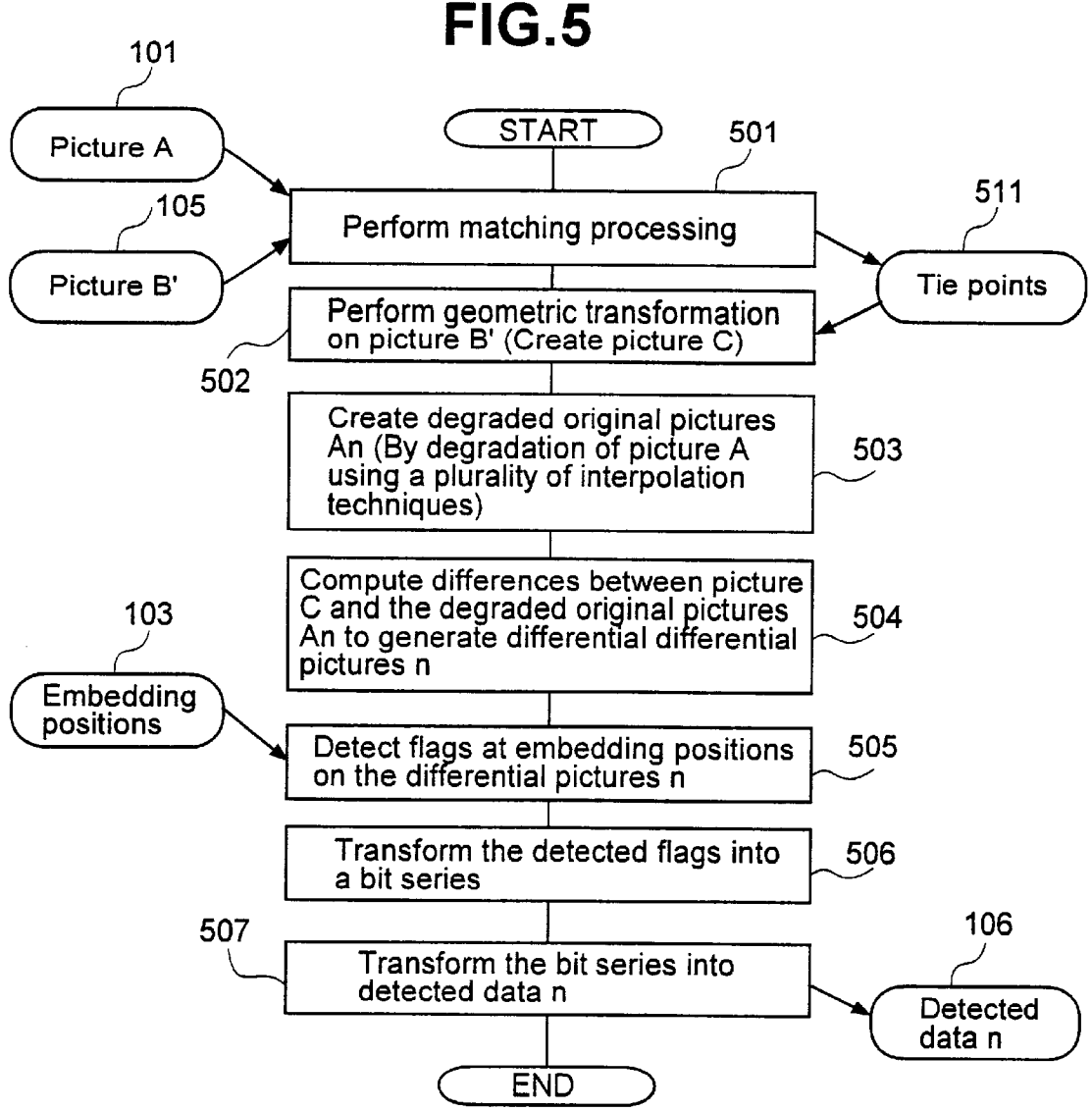

Differential pictures n (n = 0, 1, ..., p)

METHOD OF AUTHENTICATING DIGITAL-WATERMARK PICTURES

BACKGROUND OF THE INVENTION

The present invention relates to a method of authenticating a picture embedding various kinds of data such as a logo mark, a sales date and a buyer or a user as information for authentication.

A technology of embedding various kinds of hidden data such as a logo mark, a sales date and a buyer as information for authentication is in general known as a digital-watermark technology which is described in a technical article entitled "Techniques for Data Hiding", IBM Systems Journal, Vol. 35, 1996, pages 313 to 336.

According to the digital watermark technology, if a seller of a picture produced as a digital literary work embeds data showing a buyer of the picture in the original picture as information for authentication and sells the picture to the buyer as a digital-watermark picture, information corresponding to data for authentication embedded in a picture at a sales time can be extracted from the picture in case there is a doubt that the picture has been manipulated by misconduct. The extracted information can be used to form a judgment as to whether the picture has been indeed manipulated by misconduct. Further, if a result of the judgment indicates that the picture has been indeed manipulated by misconduct, the extracted information can be used for identifying the legal buyer of the picture.

It should be noted that the digital-watermark technology includes a technique that allows information for authentication to be embedded more than once to make the digital-watermark picture proof against partial extraction of the information from the picture.

By the way, a person can conceal misconduct by using the two following conceivable methods:

(1) Embedded information for authentication is removed from a digital-watermark picture.
(2) In order to prevent embedded information for authentication from being extracted, the information is falsified through typically picture transformation.

SUMMARY OF THE INVENTION

In the conventional digital-watermark technology, a variety of techniques for preventing the method (1) described above have been proposed but, as a technique for preventing the above method (2), only the technique of embedding information for authentication in a picture more than once is available. The only falsification that can be prevented by the technique of embedding information for authentication in a picture more than once is partial extraction of a digital-watermark picture.

While falsification implemented by geometrical coordinate transformation such as enlargement/shrinkage or rotation results in picture degradation, such falsification prevents the conventional digital-watermark technology from extracting information corresponding to data for authentication with a high degree of precision from a degraded picture since the conventional digital-watermark technology does not take picture degradation into account.

It is thus an object of the present invention to provide a capability of extracting information corresponding to data for authentication with a high degree of precision from a picture even if the picture has been degraded by falsification.

In order to achieve the object described above, the present invention provides a first method of authenticating a digital-watermark picture including the steps of: carrying out an embedding process to create a digital-watermark picture which is a picture embedding information for authentication into an original picture; carrying out an extraction process to extract information corresponding to the information for authentication from the picture being inspected; and carrying out an authentication process to authenticate legitimacy of the picture being inspected based on the information extracted in the extraction process, wherein the extraction process includes the steps of: carrying out a geometric transformation on the picture being inspected to transform the size of the picture being inspected into a reduced scale of the original picture; creating a plurality of degraded original pictures with different types each obtained as a result of degradation of the original picture; creating a plurality of differential pictures each obtained as a result of finding differences between the picture being inspected with a transformed size and one of the degraded original pictures with different types; and extracting information corresponding to the information for authentication from each of the differential pictures.

In addition, in order to achieve the object described above, the present invention provides a second method of authenticating a digital-watermark picture including the steps of: carrying out an embedding process to create a digital-watermark picture which is a picture embedding information for authentication in an original picture; carrying out an extraction process to extract information corresponding to the information for authentication from the picture being inspected; and carrying out an authentication process to authenticate legitimacy of the picture being inspected based on the information extracted in the extraction process, wherein the extraction process includes the steps of: carrying out a geometric transformation on the picture being inspected to transform the size of the picture being inspected into a reduced scale of the original picture; creating a plurality of degraded original pictures with different types each obtained as a result of degradation of the original picture; creating a plurality of differential pictures each obtained as a result of finding differences between the picture being inspected with a transformed size and one of the degraded original pictures with different types; and displaying the differential pictures and extracting information corresponding to the information for authentication from one of the displayed differential pictures specified externally.

Furthermore, in order to achieve the object described above, the present invention provides a third method of authenticating a digital-watermark picture including the steps of: carrying out an embedding process to create a digital-watermark picture which is a picture embedding information for authentication in an original picture; carrying out an extraction process to extract information corresponding to the information for authentication from the picture being inspected; and carrying out an authentication process to authenticate legitimacy of the picture being inspected based on the information extracted in the extraction process, wherein the extraction process includes the steps of: carrying out a geometric transformation on the picture being inspected to transform the size of the picture being inspected into a reduced scale of the original picture; creating a plurality of degraded original pictures with different types each obtained as a result of degradation of the original picture; creating a plurality of differential pictures each obtained as a result of finding differences between the picture being inspected with a transformed size and one of the degraded original pictures with different types; computing a statistic of errors for each of the differential pictures; and extracting information corresponding to the information for authentication from one of the differential pictures with a smallest computed statistic.

To be more specific, according to a concept provided by the present invention, the extraction process includes the steps of: carrying out a geometric transformation on the picture being inspected to transform the size of the picture being inspected into a reduced scale of the original picture; inferring the degree of picture degradation of the picture being inspected with a transformed size relative to the original picture; creating a degraded original picture obtained as a result of degradation of the original picture by the degree of picture degradation inferred; creating a differential picture obtained as a result of finding differences between the picture being inspected with a transformed size and the degraded original picture; and extracting information corresponding to the information for authentication from the differential picture.

Given that inference of the degree of picture degradation is the real problem to be solved, in order to allow the degree of picture degradation to be inferred, a plurality of degraded original pictures with different types are created in advance.

In either of the methods given by the present invention, a plurality of degraded original pictures with different types each obtained as a result of degradation of the original picture can be obtained in the extraction process which includes the steps of: computing geometric-transformation coefficients required for geometric transformation of the original picture into a temporary picture with a size of a reduced scale of the picture being inspected; and using a plurality of interpolation techniques of different types prepared in advance to carry out geometric transformation on the original picture to transform the original picture into temporary pictures each with a size of a reduced scale of the picture being inspected on the basis of the geometric-transformation coefficients to transform the size of each of the temporary pictures back into an original size on the basis of the geometric-transformation coefficients.

In addition, in the extraction process of either of the methods described above, it is possible to carry out a geometric transformation on the picture being inspected to transform the size of the picture being inspected into a reduced scale of the original picture on the basis of geometric-transformation coefficients which are required for the geometric transformation of the picture being inspected and computed from a plurality of tie points determining tie positions between the picture being inspected and the original picture.

BRIEF DESCRIPTION OF THE DRAWINGS

FIG. 2 is an explanatory diagram showing various kinds of data processed in the first embodiment;

FIG. 5 shows a flowchart representing a processing procedure of an extraction process carried out by the first embodiment;

FIG. 6 is an explanatory diagram showing tie points in the first embodiment;

DETAILED DESCRIPTION OF THE PREFERRED EMBODIMENTS

Some embodiments of the present invention are explained by referring to the diagrams as follows.

First Embodiment

A first embodiment of the present invention is explained as follows.

In a digital-watermark system implemented by the first embodiment, a digital-watermark picture embedding information for authentication in an original picture produced as a literary work is sold and information corresponding to information for authentication is extracted from a picture being inspected for legitimacy. The extracted information is compared with information for authentication embedded in an original picture at the time the digital-watermark picture was sold in order to discover any misconduct done by the user and to handle such misconduct if the misconduct is discovered.

Figure 1:
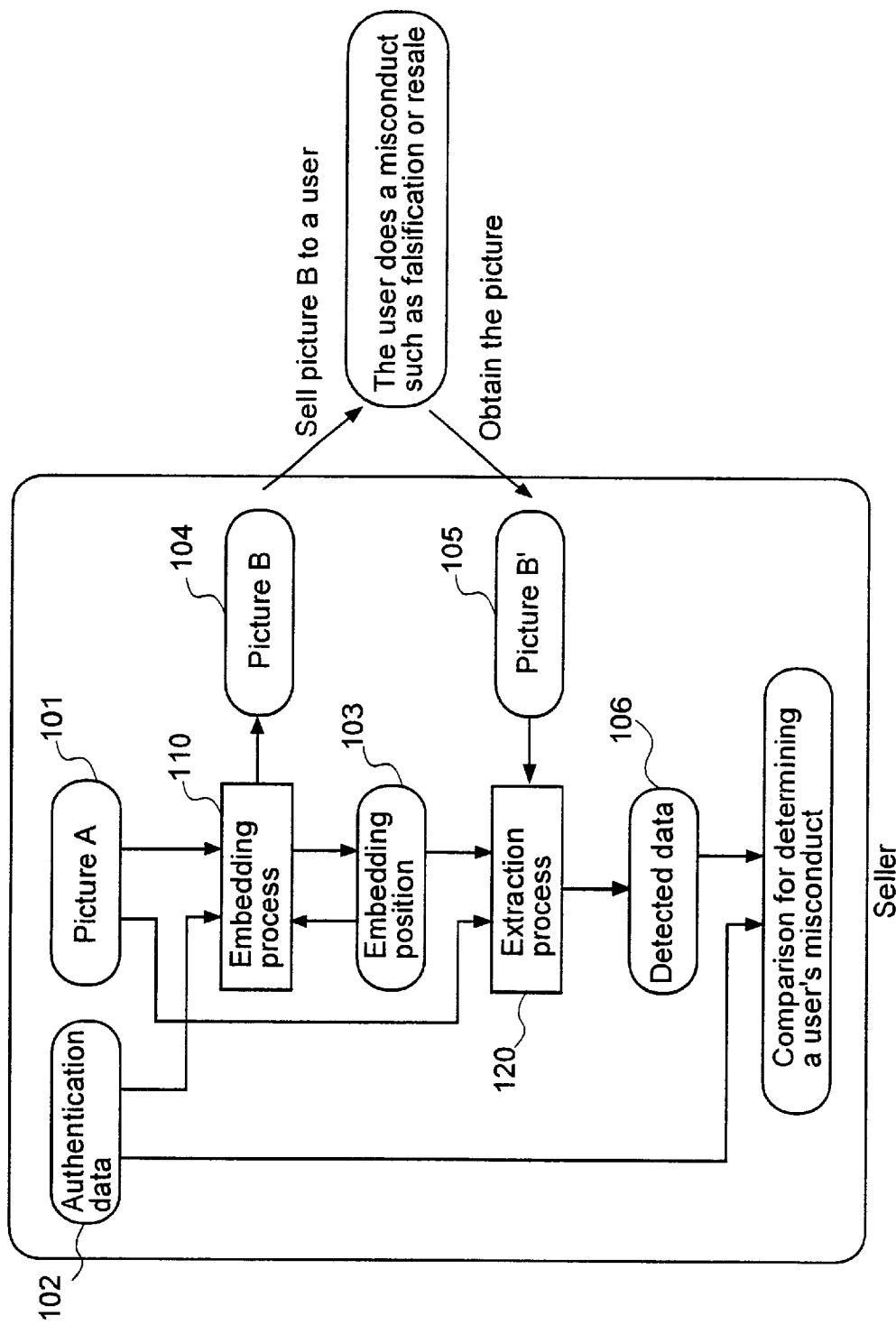
FIG. 1 is an explanatory diagram showing an outline of the operation of a digital-watermark system provided by a first embodiment.

FIG. 1 is an explanatory diagram showing an outline of the operation of a digital-watermark system provided by a first embodiment.

As shown in FIG. 1, in the digital-watermark system provided by the first embodiment, an embedding process 110 and an extraction process 120 operate in accordance with the following procedures.

Procedure 1: First of all, the embedding process 110 inputs an A picture 101 serving as an original picture and data for authentication (or information for authentication) 102, determining embedding positions 103 each showing embedding coordinates on the A picture 101. The embedding process 110 then creates a B picture 104, which is a digital-watermark picture to be sold, with the determined embedding positions 103 used as a base.

Procedure 2: Subsequently, as part of the embedding process 110, the created B picture 104 is sold to a user.

In this case, the user is assumed to do misconduct such as a falsification, a resale or a transfer on the purchased B picture 104. Let a B' picture 105 denote the picture experiencing the misconduct done by the user.

Procedure 3: The extraction process 120 obtains the B' picture 105.

Procedure 4: Subsequently, the extraction process 120 extracts detected data (data corresponding to information for authentication) 106 from the obtained B' picture 105 on the basis of the embedding positions 103.

By comparing the detected data 106 with the authentication data 102, it is possible to determine whether or not the user has done misconduct.

The digital-watermark system provided by the first embodiment can be implemented by installing a program describing algorithms for executing the procedures described above in an information processing apparatus such as a personal computer.

Various kinds of data processed in the procedures described above are explained by referring to FIG. 2.

As shown in FIG. 2, the authentication data 102 expresses powerful information for forming a judgment as to whether or not the user has done misconduct as a 2-dimensional picture with each pixel having one of 2 values, namely, 0 and 1. Examples of such information are a logo mark, a sales date and a buyer.

In addition, as shown in FIG. 2, the embedding positions 103 are put in a table showing coordinates of the authentication data 102 for the A picture 101 and numbers assigned to the coordinates. The embedding process 110 embeds the authentication data 102 in the A picture 101 at the embedding positions 103 in order to create the B picture 104.

As shown in FIG. 2, the A picture 101 and the B picture 104 are both a 2-dimensional light and dark picture, appearing to be visually identical pictures. This is because the authentication data 102 is spread sparsely throughout the entire surface of the B picture 104.

On the other hand, the B' picture 105 shown in FIG. 2 is obtained by falsification such as cutting out, rotation and enlargement/shrinkage carried out by the user on the B picture 104. The extraction process 120 extracts the detected data 106 from the B' picture 105 on the basis of the embedding positions 103. The detected data 106 extracted from the B picture 104 is the same as the authentication data 102. However, the detected data 106 extracted from the B' picture 105 is different from the authentication data 102 since the B' picture 105 is a picture obtained as a result of the falsification as shown in FIG. 2.

As described above, in the digital-watermark system implemented by the first embodiment, a digital-watermark picture (the B picture 104) obtained by embedding authentication data in an original picture (the A picture 101), or a picture (the B' picture 105) obtained as a result of falsification carried out by the user is treated as a picture to be inspected. Detected data 106 is then extracted from the picture being inspected and is compared with the authentication data 102.

As described above, falsification entailing a geometrical coordinate transformation such as an enlargement/shrinkage or a rotation results in picture degradation. With the conventional digital-watermark technology which does not take picture degradation into consideration, the detected data 106 can not be extracted from the degraded B' picture 105 being inspected with a high degree of precision.

In order to allow the detected data 106 to be extracted even from an inspected picture degraded by falsification in the first embodiment, when extracting the detected data 106, the extraction process 120 first of all carries out a geometric transformation on the picture being inspected to transform the size of the picture into a reduced scale of the original picture. The extraction process 120 then creates a plurality of degraded pictures with different types each obtained as a result of degradation of the original picture. Subsequently, the extraction process 120 computes differential pictures each representing differences in pixel value between the degraded pictures and the inspected picture completing the geometric transformation. The detected data 106 is extracted from the differential pictures in such a way that degradation components of the degraded pictures cancel degradation components of the inspected picture completing the geometric transformation.

By creating a plurality of degraded pictures with different types, one of the degraded pictures is expected to have picture degradation of the same order as the picture being inspected. By extracting the detected data 106 from a differential picture between a degraded picture having picture degradation of the same order as the picture being inspected and the picture being inspected, the precision of the detected data 106 can be increased.

The embedding process 110 is explained below to be followed by a description of the extracting process 120 which has characteristics of the first embodiment.

Figure 3:
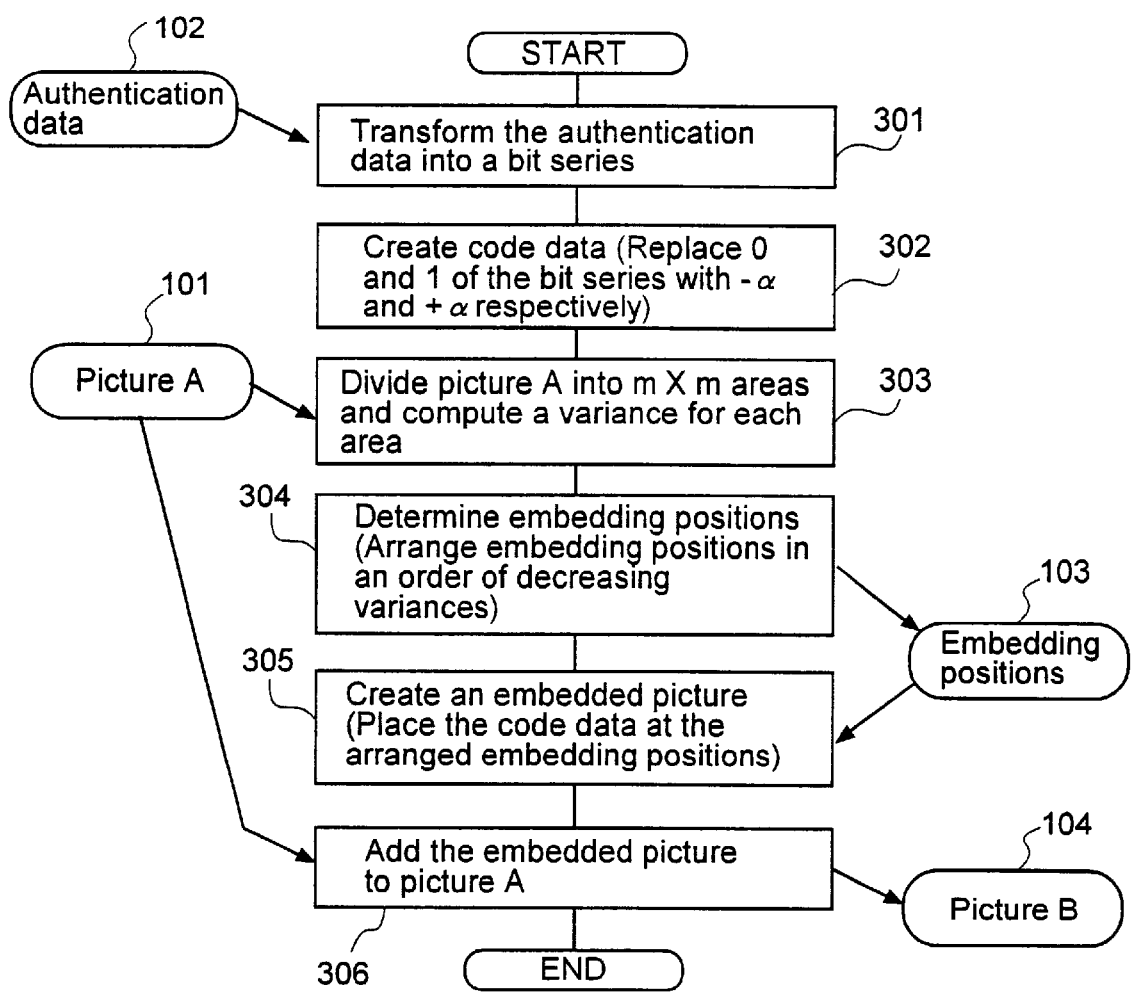
FIG. 3 shows a flowchart representing a processing procedure of an embedding process carried out by the first embodiment.

FIG. 3 shows a flowchart representing a processing procedure of the embedding process 110.

Figure 4:
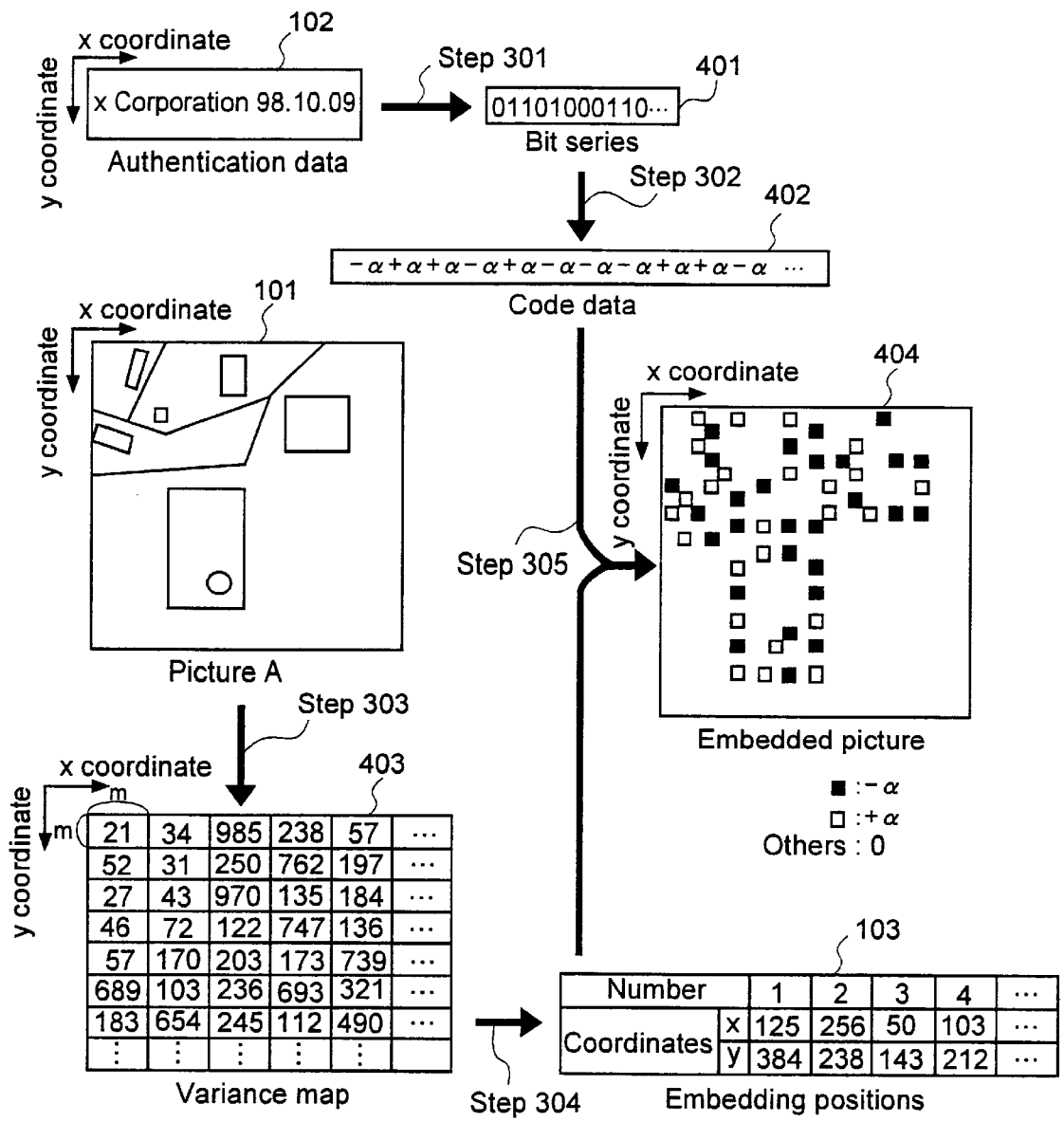
FIG. 4 is an explanatory diagram showing a processing outline of the embedding process carried out by the first embodiment.

As shown in FIG. 3, the flowchart of the embedding process 110 begins with a step 301 at which the authentication data 102 is transformed into a bit series. Details of the transformation carried out at the step 301 are shown in FIG. 4. As shown in the figure, the authentication data 102 is scanned sequentially pixel after pixel starting with a pixel at coordinates (0, 0) in the direction of the x axis, being transformed into a bit series 401, that is, a sequence of bits each having a value of either 0 or 1.

The flow of the process then goes on to a step 302 at which code data of $+/-\alpha$ where $\alpha$ is a constant is created from the bit series 401 formed at the step 301. Details of the processing carried out at the step 302 are shown in FIG. 4. As shown in the figure, a bit with a value of 0 in the bit series 401 is replaced by $-\alpha$ while a bit with a value of 1 is replaced by $+\alpha$ to form the $+/-\alpha$ code data 402.

Then, the flow of the process proceeds to a step 303 at which the A picture 101 serving as the original picture is divided into m×m areas where m is a constant and a variance for each of the areas is found. To put it in detail, a variance for each of the areas resulting from the division is found by using Eq. (1) below to produce a variance map 403 shown in FIG. 4.

$$\sigma^2 = \frac{1}{m^2} \sum_{j=1}^{m} \sum_{i=1}^{m} (p_k(i, j) - \overline{p_k})^2 \qquad (1)$$

where $\sigma$ is the variance, k is the sequence number of an area such as 1, 2 and so on to the number of all areas, $p_k$ (i, j) is the value of a pixel (i, j) in the kth area, and $\overline{p_k}$ is an average value for all pixels in the kth area.

Subsequently, the flow of the process continues to a step 304 at which embedding positions 103 are determined on the basis of the variance map 403 created at the step 303. Details of the processing carried out at the step 304 are shown in FIG. 4. The variances in the variance map 403 are sorted into an order of decreasing variance values and coordinates (x, y) of each variance are cataloged in the table as an embedding position 103 as shown in the figure in the order the variances are sorted. In this way, coordinates of each of q embedding positions 103 are determined where q is the number of all embedding positions 103, at each of which a code of the code data 402 will be embedded. That is, q>the number of codes in the code data 402. That is to say, the codes of the code data 402 will be embedded at the embedding positions 103 indicated by the numbers 1, 2 and so on to the number of codes in the code data 402.

Then, the flow of the process goes on to a step 305 to create an embedded picture 404 based on the embedding positions 103 determined at the step 304. Details of the creation of an embedded picture 404 carried out at the step 305 are shown in FIG. 4. Codes of the code data 402 are laid out at the embedding positions 103. To be more specific, the first code in the code data 402 is picked and placed at the first embedding position 103 (x=125 and y=384). By the same token, the second code in the code data 402 is picked and placed at the second embedding position 103 (x=256 and y=238). This processing is carried out repeatedly till all the q embedding positions 103 are filled. As a result, the embedded picture 404 comprises codes which have values of +α and −α and are placed at coordinates of the embedding positions 103 scattered through out the m×m areas. Codes each having a value of 0 are placed at areas other than the coordinates of the embedding positions 103.

The flow of the process then goes on to a step 306 at which the embedded picture 404 created at the step 305 is added to the A picture 101 serving as the original picture to create the B picture 104, a digital-watermark picture. To put it in detail, at the step S306, each pixel value of the embedded picture 404 at coordinates (x, y) is added to a pixel value of the A picture 101 at the same coordinates.

FIG. 5 shows a flowchart representing a processing procedure of the extraction process 120.

It should be noted that, in the following description, the B' picture 105 is a picture to be inspected.

As shown in FIG. 5, the flowchart representing the extraction process 120 begins with a step 501 at which a plurality of tie points 511 shown in FIG. 6 are found by carrying out matching processing in order to clarify a positional relation between the A picture 101 serving as the original picture and the B' picture 105 serving as the picture to be inspected.

There are a variety of methods to carry out the matching processing. In particular, the so-called template matching described in an article entitled "Digital Image Processing", pages 580 to 585 can be regarded as a basic method.

While details of the template matching are not explained, characteristics thereof are described as follows.

A template is provided for the A picture 101 while a search area is provided for a B' picture 105. A template is a picture of a small area emphasizing characteristic points such as edges in the picture whereas a search area is a picture of an area reflecting a template picture. The template matching outputs locations each with a high degree of similarity of the template to the search area. The center position of the template and locations on the template each with a high degree of similarity of the template to the search area are taken as a tie point 511 determining a tie position between the A picture 101 and the B' picture 105.

By repeating such an operation, a plurality of tie points 511 can be found. It should be noted that it is necessary to determine at least three tie points 511 at the step 501 in order to find affine-transformation coefficients to be described later.

If the matching processing carried out at the step 501 does not end in a failure, the tie points 511 found at the step 501 are all assumed to indicate accurate tie positions. In this case, the flow of the process goes on to the next step. Processing that is carried out in case the matching processing performed at the step 501 ends in a failure is described as a second embodiment.

Figure 7:
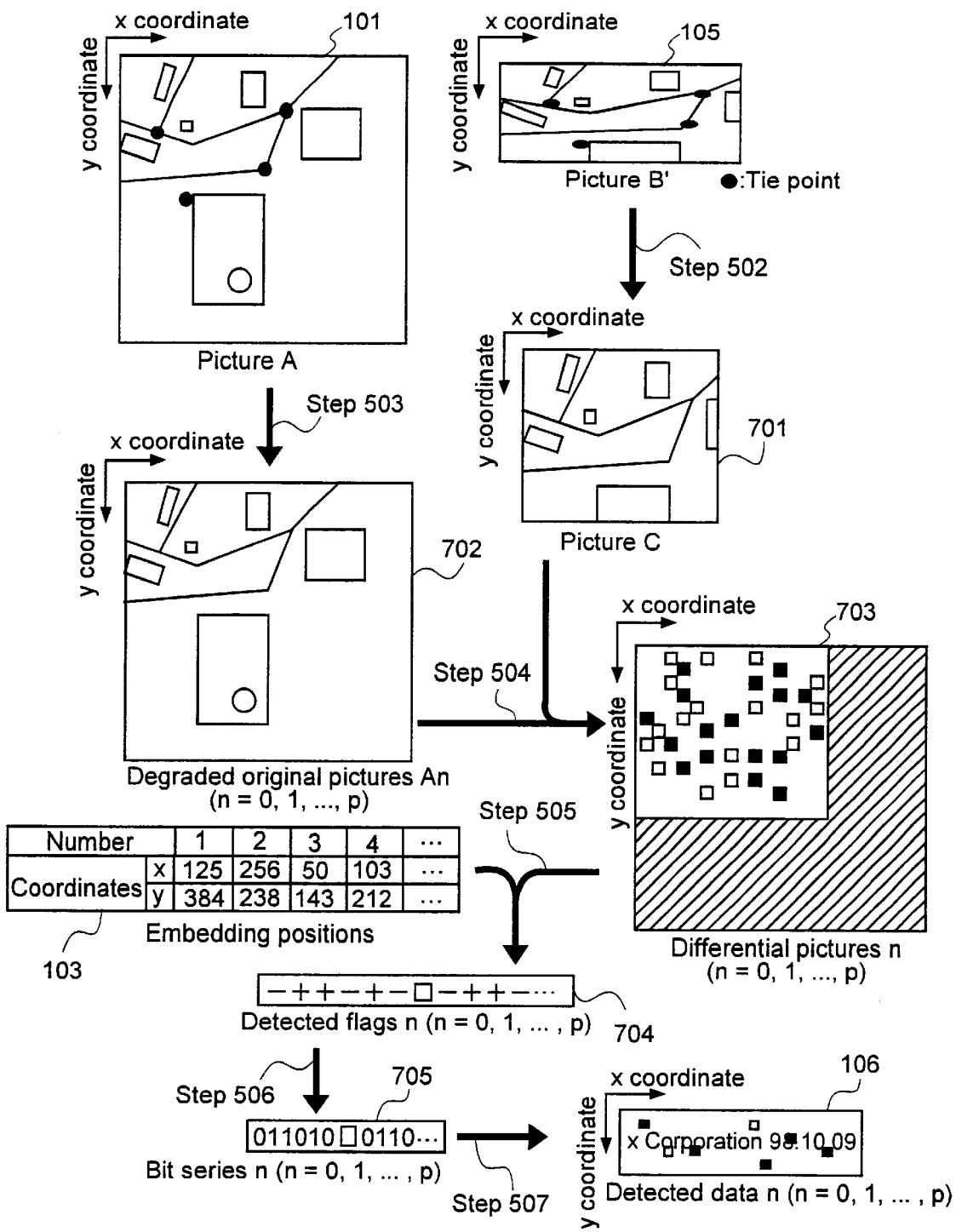
FIG. 7 is an explanatory diagram showing a processing outline of the extraction process carried out by the first embodiment.

The flow of the extraction process 120 shown in FIG. 5 then proceeds to a step 502 at which the B' picture 105 is subjected to a geometric transformation to create a picture with the same size as a reduced scale of the A picture 101 on the basis of the tie points 511 found at the step 501. To put it in detail, at the step 502, the B' picture 105 is subjected to a geometric transformation to create a C picture 701 which is the picture with the same size as a reduced scale of the A picture 101 as shown in FIG. 7.

The geometric transformation is carried out at the step 502 in accordance with the following procedure.

First of all, at the step 502, geometric-transformation coefficients are found on the basis of the tie points 511 found at the step 501 in accordance with Eqs. (3) and (4) given below. The geometric-transformation coefficients are used in the geometric transformation. As a typical geometric transformation, an affine transformation (or a linear transformation) is explained. An affine-transformation formula is expressed by Eqs. (2a) and (2b) as follows:

$$x_b = a*x_c + b*y_c + c \quad (2a)$$

$$y_b = d*x_c + e*y_c + f \quad (2b)$$

where a, b, c, d e and f are the geometric-transformation coefficients, ($x_b$, $y_b$) are coordinates of a point on the B' picture 105, and ($x_c$, $y_c$) are coordinates of a point on the C picture 701.

It should be noted that, in the geometric transformation of the B' picture 105 for transforming the B' picture 105 into the C picture 701, coordinates of each point on the B' picture 105 are computed from coordinates of a point on the C picture 701 in accordance with Eqs. (2a) and (2b) given above.

It is also worth noting that, as described above, the geometric-transformation coefficients (a, b, c, d, e and f) are computed in advance. The coefficients are found typically by using a least squares method in accordance with Eqs. (3) and (4) given as follows:

$$\begin{pmatrix} x_{b1} \\ \cdots \\ x_{bi} \end{pmatrix} = \begin{pmatrix} x_{a1} & y_{a1} & 1 \\ \cdots & \cdots & \cdots \\ x_{ai} & y_{ai} & 1 \end{pmatrix} \begin{pmatrix} a \\ b \\ c \end{pmatrix} \quad (3)$$

$$\begin{pmatrix} y_{b1} \\ \cdots \\ y_{bi} \end{pmatrix} = \begin{pmatrix} x_{a1} & y_{a1} & 1 \\ \cdots & \cdots & \cdots \\ x_{ai} & y_{ai} & 1 \end{pmatrix} \begin{pmatrix} d \\ e \\ f \end{pmatrix} \quad (4)$$

where ($X_{a1}$, $Y_{a1}$), . . . ($X_{ai}$, $Y_{ai}$) are coordinates of tie points on the A picture 101, ($X_{b1}$, $Y_{b1}$) . . . , ($X_{bi}$, $Y_{bi}$) are coordinates of tie points on the B' picture 105 and i is the number of tie points on each of the A picture 101 and the B' picture 105.

To be more specific. at the step 502, the coordinates of a lattice point (xc, yc) of interest on the C picture 701 are subjected to a geometric transformation based on the affine-transformation formulas expressed by Eqs. (2a) and (2b) to compute the coordinates of a floating point (xb, yb) on the B' picture 105. Furthermore, pixel values at 4×4 lattice points in close proximity to the floating point (xb, yb) on the B' picture 105 are used to compute a pixel value at the lattice point (xc, yc) of interest on the C picture 701 by cubic convolution.

It should be noted that, described in the reference entitled "Digital Image Processing", pages 300 and 301, details of the cubic convolution are not explained in this specification.

The flow of the extraction process 120 shown in FIG. 5 then goes on to a step 503 to create a plurality of degraded pictures of different types each obtained as a result of degradation of the A picture 101. To put it in detail, at the step 503, the A picture 101 is degraded to create degraded original pictures An 702 where n =1, 2, . . . , p where p is the number of interpolation techniques as shown in FIG. 7.

The processing to create the degraded original pictures An 702 is carried out at the step 503 in accordance with a procedure which is explained by referring to FIG. 8 as follows.

Figure 8:
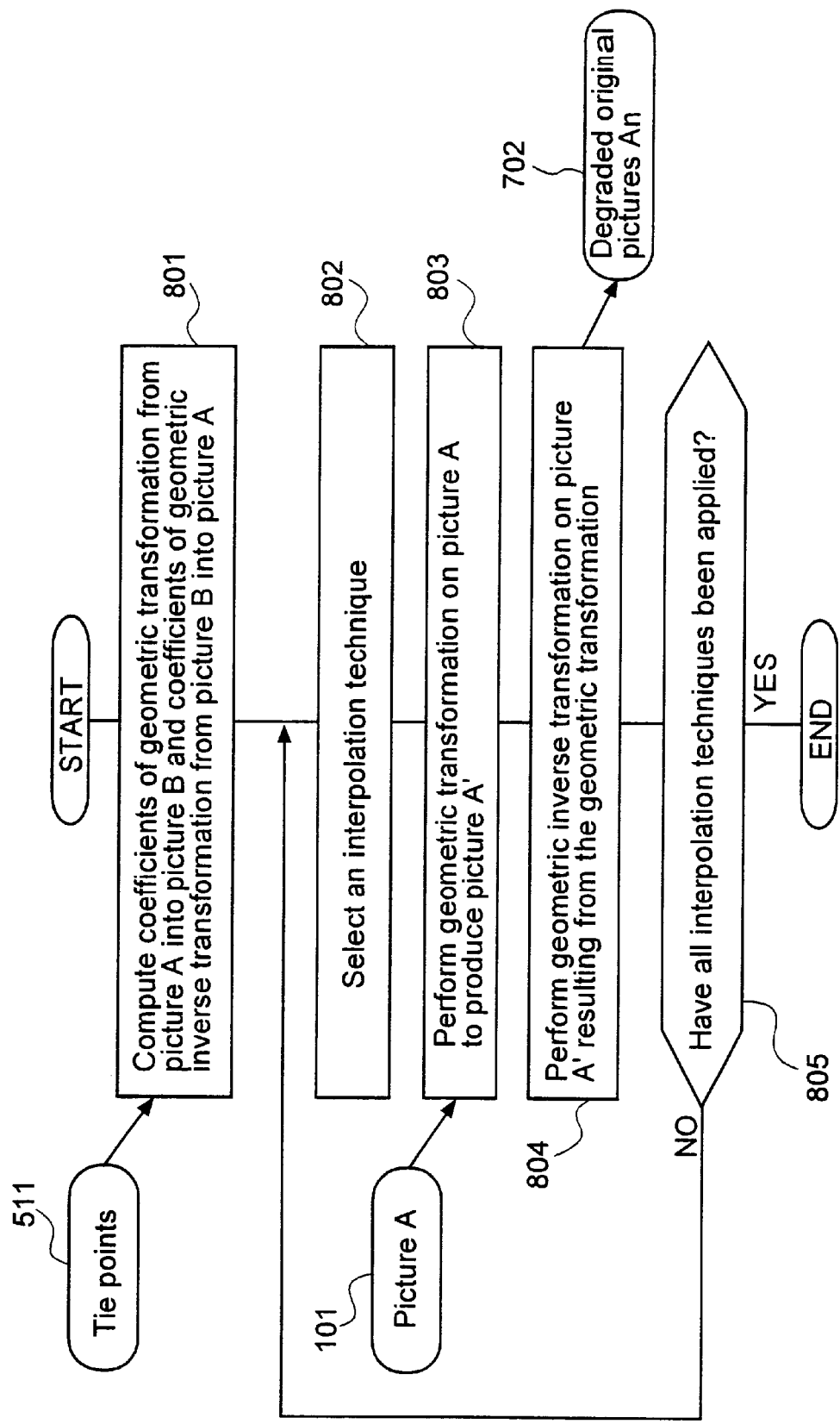
FIG. 8 shows a flowchart representing a procedure to create a degraded picture in the extraction process shown in FIG. 5.

As shown in FIG. 8, the procedure of the step 503 begins with a step 801 at which coefficients of geometric transformation from the A picture 101 into the B picture 104 and coefficients of inverse geometric transformation from the B picture 104 back into the A picture 101 are computed on the basis of the tie points 511 found at the step 501. The coefficients of geometric transformation and the coefficients of geometric inverse transformation are computed in the same way as the computation carried out at the step 502.

The flow of the procedure then goes on to a step 802 at which one of a plurality of interpolation techniques with different types, prepared in advance, is selected. Assume that three interpolation techniques, namely, cubic convolution, bi-linear interpolation and nearest-neighbor interpolation can be used. Thus, the number p of the interpolation techniques is 3 in this case. It should be noted that, described in the reference entitled "Digital Image Processing", pages 300 and 301, details of the interpolation techniques are not explained in this specification.

Then, the flow of the procedure then goes on to a step 803 at which the A picture 101 is subjected to a geometric transformation to create a picture A' by using the interpolation technique selected at the step 802. To put it in detail, at the step 803, the coordinates of a lattice point (xa', ya') of interest on the picture A' are subjected to a geometric transformation based on geometric-transformation formulas like ones shown in Eqs. (2a) and (2b) to compute the coordinates of a floating point (xa, ya) on the A picture 101. Furthermore, pixel values at lattice points in close proximity to the floating point (xa, ya) on the A picture 101 are used as a base for computation of a pixel value at the lattice point (xa', ya') of interest on the picture A' by using the interpolation technique selected to create the picture A'.

Subsequently, the procedure continues to a step 804 at which the picture A' created at the step 803 is subjected to a geometric inverse transformation to create a degraded original picture An. It should be noted that the geometric inverse transformation is carried out at the same way as the geometric transformation of the step 803 with the cubic convolution used as an interpolation technique.

The pieces of processing of the steps 801 to 804 and the step 805 are carried out repeatedly till the outcome of the judgment formed at the step 805 indicates that all the interpolation techniques, namely, the cubic convolution, the bi-linear technique and the nearest-neighbor technique, have been used.

In this way, a plurality of degraded original pictures An 702 with different types each obtained as a result of degradation of the A picture 101 can be created. One of the degraded original pictures An 702 has picture degradation of the same order as the B' picture 105 which has been degraded by the user by falsification, and the extraction precision of the detected data 106 to be described later from such a degraded original picture An 702 can thus be increased.

Refer back to FIG. 5. The flow of the extraction process 120 goes on to a step 504 at which differences between the C picture 701 created at the step 502 and the degraded original pictures An 702 created at the step 503 are found. To put it in detail, at the step 504, a degraded original picture An 702 is subtracted from the C picture 701 to create a differential picture n 703 as shown in FIG. 7. To put it concretely, processing to compute a difference in value of a pixel at the same coordinates (x, y) between the C picture 701 and a degraded original picture An 702 is carried out repeatedly for all pixels. In case a pixel at the same coordinates as a pixel on the degraded original picture An 702 does not exist on the C picture 701 due to the fact that the C picture 701 is smaller than the degraded original picture An 702, the difference is set at 0.

If the degree of degradation of the C picture 701 relative to the A picture 101 is the same as the degree of degradation of the degraded original picture An 702 relative to the A picture 101, the resulting differential picture n 703 will be entirely or partially similar to the embedded picture 404 created at the step 305 of the flowchart shown in FIG. 3 by placing the code data 402.

Assume that the value of a pixel at coordinates (x, y) on the C picture 701 is c and the true value of the pixel without picture degradation is c' (=c+γ) where γ is a degradation value. By the same token, assume that the value of a pixel at the same coordinates (x, y) on the degraded original picture An 702 with the same degree of degradation as the C picture 701 is a and the true value of the pixel without picture degradation is a' (=a+γ) where γ is the same degradation value. In this case, the difference in value of a pixel at the same coordinates between the C picture 701 and a degraded original picture An 702 (c−a) is {(c'−γ)−(a'−γ)}= c'−a' which is the difference in true value between the C picture 701 and the degraded original picture An 702. Since the degradation value γ on the C picture 701 cancels the degradation value γ on the degraded original picture An 702, the differential picture n 703 represents differences between true values of the C picture 701 (c') and true values of the degraded original picture An 702 (a') or differences between the B picture 104 created at the step 306 of the flowchart shown in FIG. 3 and the original A picture 101 which are the embedded picture 404 itself.

The flow of the extraction process then goes on to a step 505 to detect a flag of the value of a pixel at an embedding position 103 from the differential picture n 703 created at the step 504. It should be noted that the embedding position 103 has been determined in the embedding process 110. To put it in detail, at the step 505, the flag of the value of a pixel at every embedding position 103 from the differential picture n 703 created at the step 504 is inspected to determine whether the flag is positive or negative. Results of the examination and the determination are put in an array of detected flags n 704 shown in FIG. 7. To put it concretely, an average of pixel values in a small area of m×m pixels centered at the coordinates of an embedding position 103 is computed. Such an average is computed for all embedding positions 103 in the same order shown in FIG. 4 to produce the array of detected flags n 704. If the average is positive, a+ value is set for the flag and, if the average is negative, on the other hand, a− value is set for the flag. A blank flag represents an average value of 0. A flag array n 704 is created for each of the differential pictures n 703, that is, for n=1 to p where p is the number of the interpolation techniques. A number of an embedding position 103 may be assigned to a plurality of different coordinate sets. That is to say, variances at such coordinates sets are equal to each other. In this case, the value of the flag at the embedding position 103 is determined on a majority basis. To be more specific, if the number of + values determined by the averages for the embedding position 103 is greater than the number of − values, the flag is set at a + value. If the number of − values determined by the averages for the embedding position 103 is greater than the number of + values, on the other hand, the flag is set at a − value.

The flow of the process then continues to a step 506 at which the array of detected flags n 704 created at the step 505 is transformed into a bit series 705. To put it in detail, at the step 506, a + value of a detected flag n 704 is transformed into a 1, a − value is transformed into a 0 and a blank is kept as it is as shown in FIG. 7. This processing is carried out for the n flags to generate the bit series 705 which is a sequence of bits having values of 0 and 1.

The flow of the process then continues to a step 507 at which the bit series 705 created at the step 506 is transformed into detected data n 106. To put it in detail, at the step 507, the bit series 705 is scanned sequentially bit after bit and each bit is replaced by the value of a pixel at the embedding position 103 associated with the bit to generate the detected data n 106 shown in FIG. 7.

The extraction process 120 described above results in p sets of detected data 106 obtained from differences between the degraded original pictures An 702 and the C picture 701. If any set of detected data 106 is similar to the authentication data 102, the B' picture 105 can be judged to have been obtained by falsification of the B picture 104, proving that the user has done misconduct.

As described above, the extraction process 120 to extract detected data 106 according to the first embodiment includes the steps of: carrying out a geometric transformation on a picture being inspected to transform the picture being inspected into a transformed picture with the same size as a reduced scale of the original picture; creating a plurality of degraded original pictures with different types each obtained as a result of degradation of the original picture; creating a plurality of differential pictures by subtraction of the degraded original pictures from the transformed picture to cancel degradation components in the transformed picture; and extracting detected data 106. As a result, even in the case of an inspected picture degraded by falsification, the detected data 106 can be obtained with a high degree of precision.

In the first embodiment described above, the authentication data 102 is a 2-dimensional picture. It should be noted, however, that the authentication data 102 can also be an array of character codes such as ASCII codes. In this case, the array of character codes is transformed into a bit series by the embedding process 110 at the step 301 of the flowchart shown in FIG. 3, and the bit series is transformed back into the array of character codes which is output as the detected data 106 by the extraction process 120 at the step 507 of the flowchart shown in FIG. 5.

In addition, in the first embodiment, the extraction process 120 creates p sets of detected data 106. It is worth noting, however, that the extraction process 120 can also create only one set of detected data 106. In this case, the detected data 106 is obtained from a differential picture n 703 which is selected as a proper picture for extraction of the detected data 106 among p differential pictures n 703. The pieces of processing of the steps 505 to 507 of the flowchart shown in FIG. 5 are carried out on the selected differential picture n 703.

There are the following two conceivable techniques for selecting a differential picture n 703 as a proper picture for extraction of the detected data 106.

According to one of the selection techniques, the p differential pictures n 703 are printed or displayed to be selected by the inspector after visually examining the pictures n 703. The inspector eliminates differential pictures n 703 each having much noise and selects a differential picture, areas of m×m pixels in close proximity to embedding positions 103 of which can be verified visually.

According to the other selection technique, statistics such as RMSs (root mean squares) of the p differential pictures n 703 are used as a basis for selecting one of them. Typically, a differential picture n 703 with a smallest RMS is selected.

In addition, in the first embodiment, the detected data 106 is compared with the authentication data 102 to determine whether or not the user has done misconduct. It should be noted, however, that in the case of detected data 106 with a high degree of precision, such comparison is not necessary. The contents of the detected data 106 not the user has done misconduct.

Moreover, in the first embodiment, only one set of authentication data 102 is used. It should be noted, however, that in the case of an A picture 101 to be sold to a plurality of users, different sets of authentication data 102 can be used. In this case, a plurality of sets of authentication data 102 can be prepared for the same plurality of users with each set having contents unique to the user to which the digital-watermark picture embedding the set of authentication data 102 is sold. In this case, the embedding process 110 is carried out as many times as the sets of authentication data 102. It should be noted nevertheless that, in this case, the embedding positions 103 do not change no matter how many times the embedding process 110 is carried out. Thus, embedding positions 103 determined at the first execution of the embedding process 110 can be used for the second and subsequent executions. That is to say, the pieces of processing of the steps 303 to 304 of the flowchart shown in FIG. 3 can be eliminated for the second and subsequent executions of the embedding process 110.

Second Embodiment

Next, a second embodiment of the present invention is explained.

The second embodiment is characterized in that tie points 511 found in the matching processing carried out at the step 501 of the flowchart shown in FIG. 5 are corrected in case the matching processing ends in a failure, that is, in case the positional errors of the tie points 511 are large.

By correcting tie points 511, the positional precision of the C picture 701 with respect to the A picture 101 can be improved so that the precision of the detected data 106 can also be increased as well. It should be noted that, as described earlier, the C picture 701 is obtained as a result of carrying out a geometric transformation on the B' picture 105 and has the same size as a reduced scale of the A picture 101.

The only difference between the second embodiment and the first embodiment is that the former corrects tie points 511 in the extraction process 120. Only the correction of tie points 511 is thus explained as follows.

Figure 9:
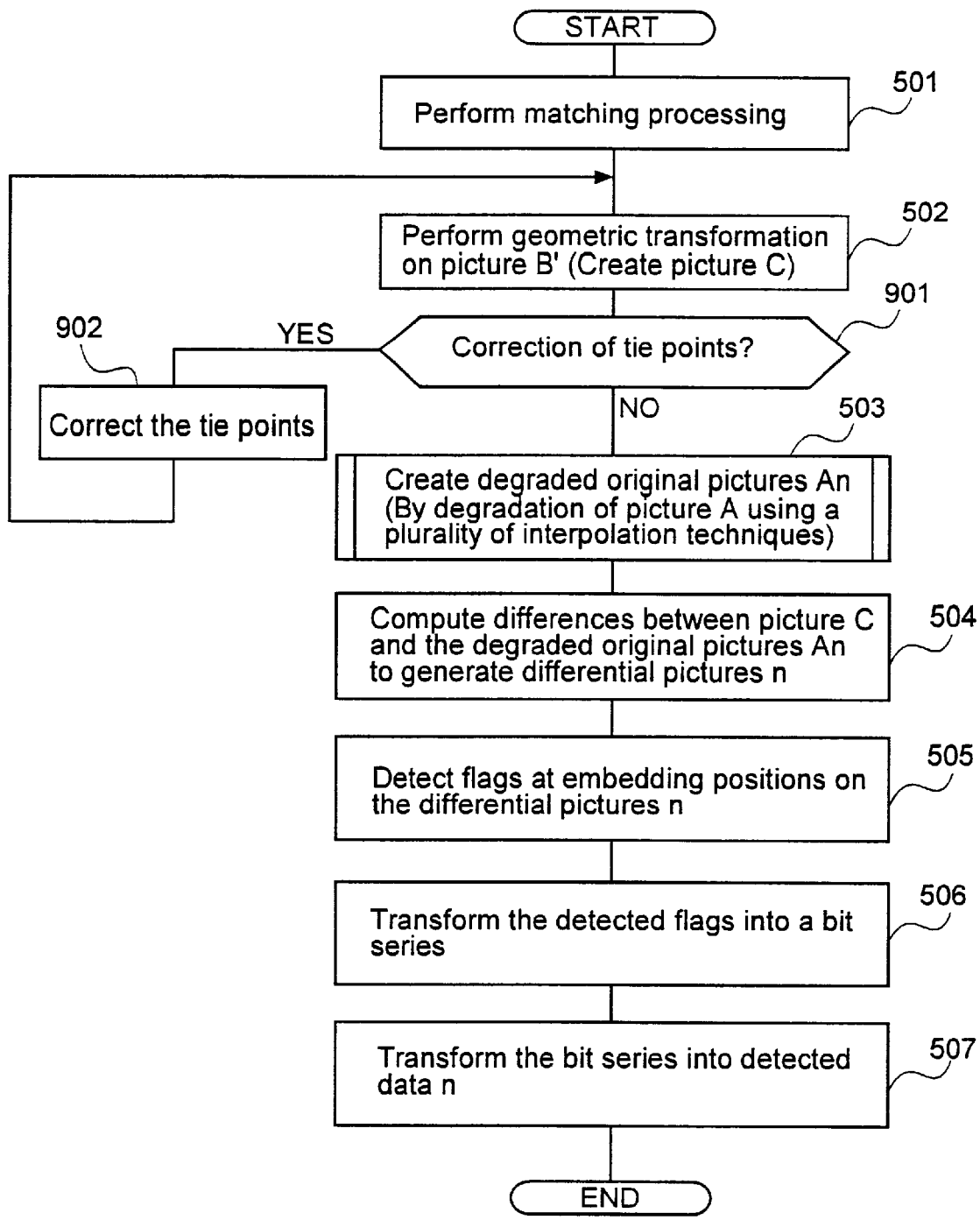
FIG. 9 shows a flowchart representing a processing procedure of an extraction process carried out in a second embodiment.

FIG. 9 shows a flowchart representing a processing procedure of the extraction process 120.

Also in this case, the B' picture 105 is a picture being inspected.

As shown in FIG. 9, the flowchart representing the extraction process 120 begins with the steps 501 and 502 of the flowchart shown in FIG. 5 at which the same pieces of processing are carried out.

The flow of the process then goes on to a step 901 to form a judgment as to whether or not it is necessary to correct tie points 511 found at the step 501. To put it in detail, at the step 901, in order to form a judgment as to whether or not it is necessary to correct tie points 511, the A picture 101 and the C picture 701 are both displayed and the inspector visually checks a degree of deformation of the C picture 701 with respect to the A picture 101.

Deformation means a shift or distortion of a picture being compared with the original picture. If the degree of deformation is low, the inspector enters a command to continue the extraction process to the step 503 of the flowchart shown in FIG. 5 to carry out the pieces of processing of the steps 503 to 507.

If the degree of deformation is found high at the step 901, on the other hand, it is necessary to correct the tie points 511. In this case, the inspector enters a command to continue the extraction process to the step 902 at which the tie points 511 are corrected.

The processing of the step 902 is carried out as follows.

Figure 10:
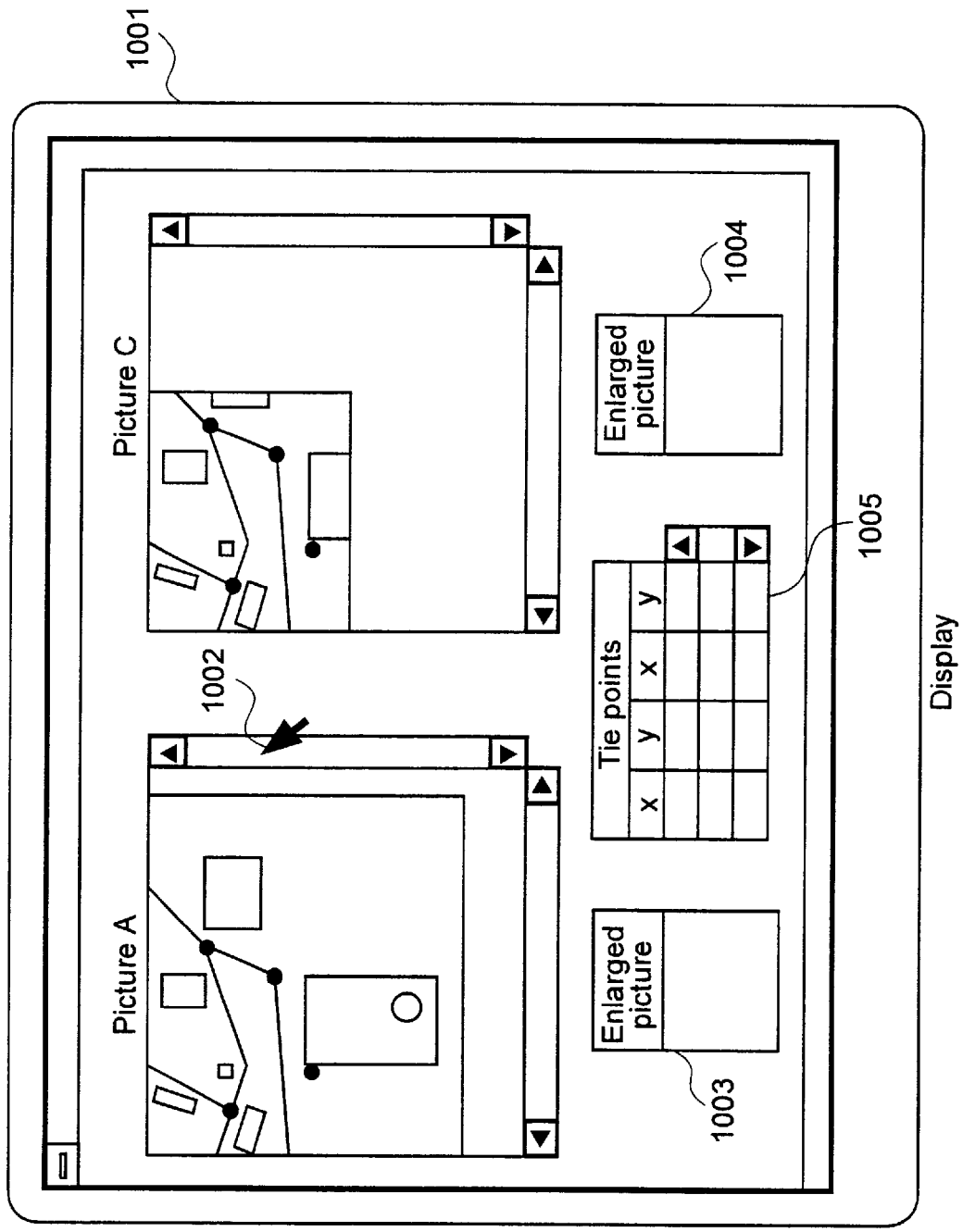
FIG. 10 is an explanatory diagram showing an input interface for correcting a tie point in the second embodiment.

At the step 902, first of all, the A picture 101 and the C picture 701 are displayed on a display screen 1001 with tie points of the A picture 101 superposed on the A picture 101 and tie points of the B' picture 105 subjected to a coordinate transformation and superposed on the C picture 701 as shown in FIG. 10. It should be noted that coordinate transformation of tie points is processing carried out at the step 502 of the flowchart shown in FIG. excluding the interpolation.

A desired tie point is corrected as follows. The inspector moves a pointer 1002 on the display screen 1001 by operating an input device such as a mouse to move the desired tie point to a corrected position. A characteristic location on the A picture 101 and the C picture 701 is verified visually, and a corrected position is specified by moving the pointer 1002 to point to a location in close proximity to the center of the characteristic position.

In order to enable the inspector to verify a specified position, it is desirable to display enlarged pictures of locations in close proximity to the specified position on enlarged display areas 1003 to 1004 as shown in FIG. 10.

Specified positions are displayed on a tie-point table 1005. When all tie points have been corrected, the correction inspector is allowed to enter a command to return the extraction process 120 to the step 502. It should be noted that, when the extraction process 120 goes back to the step 502, a new tie point on the C picture 701 is subjected to a coordinate transformation to a tie point on the B' picture 105 to be changed to tie points 511 along with a new tie point on the A picture 101.

In this way, even if the matching processing carried out at the step 501 ends in a failure, that is, in case the positional errors of the tie points 511 are large, a tie point 511 can be corrected by using the C picture 701 which has been obtained as a result of a geometric transformation of the B' picture 105 to transform the size of the B' picture 105 to a reduced scale of the A picture 101.

Thus, according to the second embodiment, by correcting tie points 511, the positional precision of the C picture 701 with respect to the A picture 101 can be improved so that the precision of the detected data 106 can also be increased as well.

In the second embodiment, a tie point 511 is corrected by using the A picture 101 and the c picture 701. It should be noted, however, that, a differential picture An 703 can also be used in place of the C picture 701.

Figure 11:
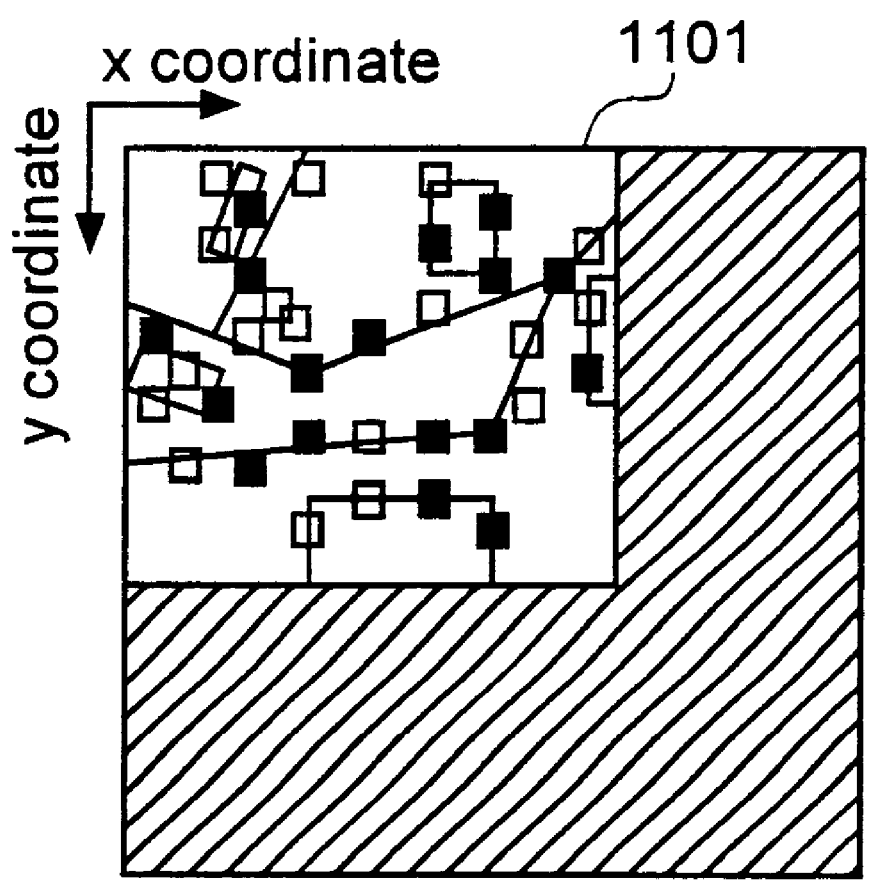
FIG. 11 is an explanatory diagram showing a differential picture in the second embodiment.

FIG. 11 is a diagram showing a typical differential picture An 703 for a tie point 511 with a large positional error.

As shown in FIG. 11, in the case of a differential picture 1101 for a tie point 511 with a large positional error, a stripe degradation is resulted in. This degradation is caused not only by embedded code data 402 due to a positional error but also by the fact that an edge of an object reflected in the A picture 101 is exposed. The inspector then specifies a position of a tie point in the correction of the tie point using a differential picture 1101 so that the exposure of the edge does not stand conspicuous.

By the way, in either of the first and second embodiments, a location with a high degree of degradation like the differential picture 1101 shown in FIG. 11, if any, is treated as an undetectable area at the step 504 of the flowchart shown in FIG. 5. Then, the pieces of processing of the step 504 and the subsequent steps can be carried out for areas other than the undetectable area.

As described above, according to the present invention, information corresponding to authentication data can be extracted with a high degree of accuracy from an even inspected picture degraded by falsification by executing the steps of: carrying out a geometric transformation on a picture being inspected to transform the size of the picture being inspected into a reduced scale of the original picture; creating a plurality of degraded original pictures with different types each obtained as a result of degradation of the original picture; creating a plurality of differential pictures by subtraction of the degraded original pictures from the picture being inspected with a transformed size to cancel degradation components in the picture being inspected with a transformed size; and extracting the information corresponding to the authentication data.

What is claimed is:

1. A method of authenticating a digital-watermark picture by execution of:

an embedding process to create a digital-watermark picture as a picture obtained by embedding information for authentication into an original picture;

an extraction process to extract information corresponding to said information for authentication from a picture being inspected; and an authentication process to authenticate legitimacy of said picture being inspected on the basis of said information extracted in said extraction process, wherein said extraction process comprises the steps of:

carrying out geometric transformation on said picture being inspected to transform the size of said picture being inspected into a reduced scale of said original picture;

creating a plurality of degraded original pictures with different types by degradation of said original picture;

creating a plurality of differential pictures each representing differences between said picture being inspected with a transformed size and said degraded original pictures; and extracting information corresponding to said information for authentication from each of said differential pictures.

2. A method of authenticating a digital-watermark picture according to claim 1, wherein said step of creating a plurality of degraded original pictures with different types by degradation of said original picture in said extraction process comprises the sub-steps of:

computing geometric-transformation coefficients required for geometric transformation of said original picture to transform the size of said original picture into a reduced scale of said picture being inspected; and using a plurality of interpolation techniques of different types each prepared in advance to carry out geometric transformation on said original picture to transform the size of said original picture into a reduced scale of said picture being inspected on the basis of said geometric-transformation coefficients to transform said transformed size back into an original size on the basis of said geometric-transformation coefficients.

3. A method of authenticating a digital-watermark picture according to claim 2, wherein said step of carrying out geometric information on said picture being inspected to transform the size of said picture being inspected into a reduced scale of said original picture in said extraction process comprises the sub-steps of:
computing geometric-transformation coefficients required for geometric transformation of said picture being inspected from a plurality of tie points determining tie positions between said picture being inspected and said original picture; and
carrying out geometric information on said picture being inspected to transform the size of said picture being inspected into a reduced scale of said original picture on the basis of said computed geometric-transformation coefficients.

4. A method of authenticating a digital-watermark picture according to claim 1, wherein said step of carrying out geometric information on said picture being inspected to transform the size of said picture being inspected in to a reduced scale of said original picture in said extraction process comprises the sub-steps of:
computing geometric-transformation coefficients required for geometric transformation of said picture being inspected from a plurality of tie points determining tie positions between said picture being inspected and said original picture; and
carrying out geometric information on said picture being inspected to transform the size of said picture being inspected into a reduced scale of said original picture on the basis of said computed geometric-transformation coefficients.

5. A method of authenticating a digital-watermark picture according to claim 4 wherein said picture being inspected with a transformed size obtained as a result of said geometric transformation carried out on said picture being inspected and said original picture are at least displayed, and a position on said displayed picture being inspected with a transformed size or said displayed original picture which is specified externally is accepted as a tie point.

6. A method of authenticating a digital-watermark picture by execution of:
an embedding process to create a digital-watermark picture as a picture obtained by embedding information for authentication into an original picture;
an extraction process to extract information corresponding to said information for authentication from a picture being inspected; and
an authentication process to authenticate legitimacy of said picture being inspected on the basis of said information extracted in said extraction process,
wherein said extraction process comprises the steps of:
carrying out geometric transformation on said picture being inspected to transform the size of said picture being inspected into a reduced scale of said original picture;
creating a plurality of degraded original pictures with different types by degradation of said original picture;
creating a plurality of differential pictures each representing differences between said picture being inspected with a transformed size and said degraded original pictures;
displaying said differential pictures to be externally selected; and
extracting information corresponding to said information for authentication from said externally selected differential picture.

7. A method of authenticating a digital-watermark picture according to claim 6, wherein said step of creating a plurality of degraded original pictures with different types by degradation of said original picture in said extraction process comprises the sub-steps of:
computing geometric-transformation coefficients required for geometric transformation of said original picture to transform the size of said original picture into a reduced scale of said picture being inspected; and
using a plurality of interpolation techniques of different types each prepared in advance to carry out geometric transformation on said original picture to transform the size of said original picture into a reduced scale of said picture being inspected on the basis of said geometric-transformation coefficients to transform said transformed size back into an original size on the basis of said geometric-transformation coefficients.

8. A method of authenticating a digital-watermark picture according to claim 6, wherein said step of carrying out geometric information on said picture being inspected to transform the size of said picture being inspected into a reduced scale of said original picture in said extraction process comprises the sub-steps of:
computing geometric-transformation coefficients required for geometric transformation of said picture being inspected from a plurality of tie points determining tie positions between said picture being inspected and said original picture; and
carrying out geometric information on said picture being inspected to transform the size of said picture being inspected into a reduced scale of said original picture on the basis of said computed geometric-transformation coefficients.

9. A method of authenticating a digital-watermark picture by execution of:
an embedding process to create a digital-watermark picture as a picture obtained by embedding information for authentication into an original picture;
an extraction process to extract information corresponding to said information for authentication from a picture being inspected; and
an authentication process to authenticate legitimacy of said picture being inspected on the basis of said information extracted in said extraction process,
wherein said extraction process comprises the steps of:
carrying out geometric transformation on said picture being inspected to transform the size of said picture being inspected into a reduced scale of said original picture;
creating a plurality of degraded original pictures with different types by degradation of said original picture;
creating a plurality of differential pictures each representing differences between said picture being inspected with a transformed size and said degraded original pictures;
computing an error statistic for each of said differential pictures; and extracting information corresponding to said information for authentication from one of said differential pictures with a smallest error statistic.

10. A method of authenticating a digital-watermark picture according to claim 9, wherein said step of creating a plurality of degraded original pictures with different types by degradation of said original picture in said extraction process comprises the sub-steps of:

computing geometric-transformation coefficients required for geometric transformation of said original picture to transform the size of said original picture into a reduced scale of said picture being inspected; and using a plurality of interpolation techniques of different types each prepared in advance to carry out geometric transformation on said original picture to transform the size of said original picture into a reduced scale of said picture being inspected on the basis of said geometric-transformation coefficients to transform said transformed size back into an original size on the basis of said geometric-transformation coefficients.

11. A method of authenticating a digital-watermark picture according to claim 9, wherein said step of carrying out geometric information on said picture being inspected to transform the size of said picture being inspected into a reduced scale of said original picture in said extraction process comprises the sub-steps of:

computing geometric-transformation coefficients required for geometric transformation of said picture being inspected from a plurality of tie points determining tie positions between said picture being inspected and said original picture; and carrying out geometric information on said picture being inspected to transform the size of said picture being inspected into a reduced scale of said original picture on the basis of said computed geometric-transformation coefficients.

* * * * *